United States Patent  [15] 3,658,305
Newtson  [45] Apr. 25, 1972

[54] AERATION DEVICE
[72] Inventor: N. Keith Newtson, Forrest, Ill.
[73] Assignee: Thrive Centers, Inc., Chicago, Ill.
[22] Filed: May 8, 1969
[21] Appl. No.: 824,384

Related U.S. Application Data
[63] Continuation of Ser. No. 646,333, June 15, 1967, abandoned.

[52] U.S. Cl. ..................................... 261/92, 210/219
[51] Int. Cl. ........................................................ B01f 7/04
[58] Field of Search ............... 261/91, 92, 122; 210/219

[56] References Cited
UNITED STATES PATENTS
3,109,875 11/1963 Schramm et al. ....................... 261/92
3,274,993 9/1966 Martin ..................................... 126/113
3,322,410 5/1967 Ahlenius ................................. 261/92
3,452,873 7/1969 Blough ................................. 261/92 X Primary Examiner—Frank W. Lutter
Assistant Examiner—Steven H. Markowitz
Attorney—Merriam, Marshall, Shapiro & Klose

[57] ABSTRACT

Aeration rotor mounted in pit containing liquid for receiving animal waste. Rotor aerates liquid in pit. Rotor includes structure for entrapping air from above liquid and releasing it beneath surface of liquid. Rotor includes structure for lifting liquid above surface thereof and then spilling it back. Deflector structure directs liquid, carried around rotor and dropping behind rotor, toward rotor bottom while permitting foam accumulations behind rotor to pass through rotor to prevent foam build-up.

12 Claims, 6 Drawing Figures

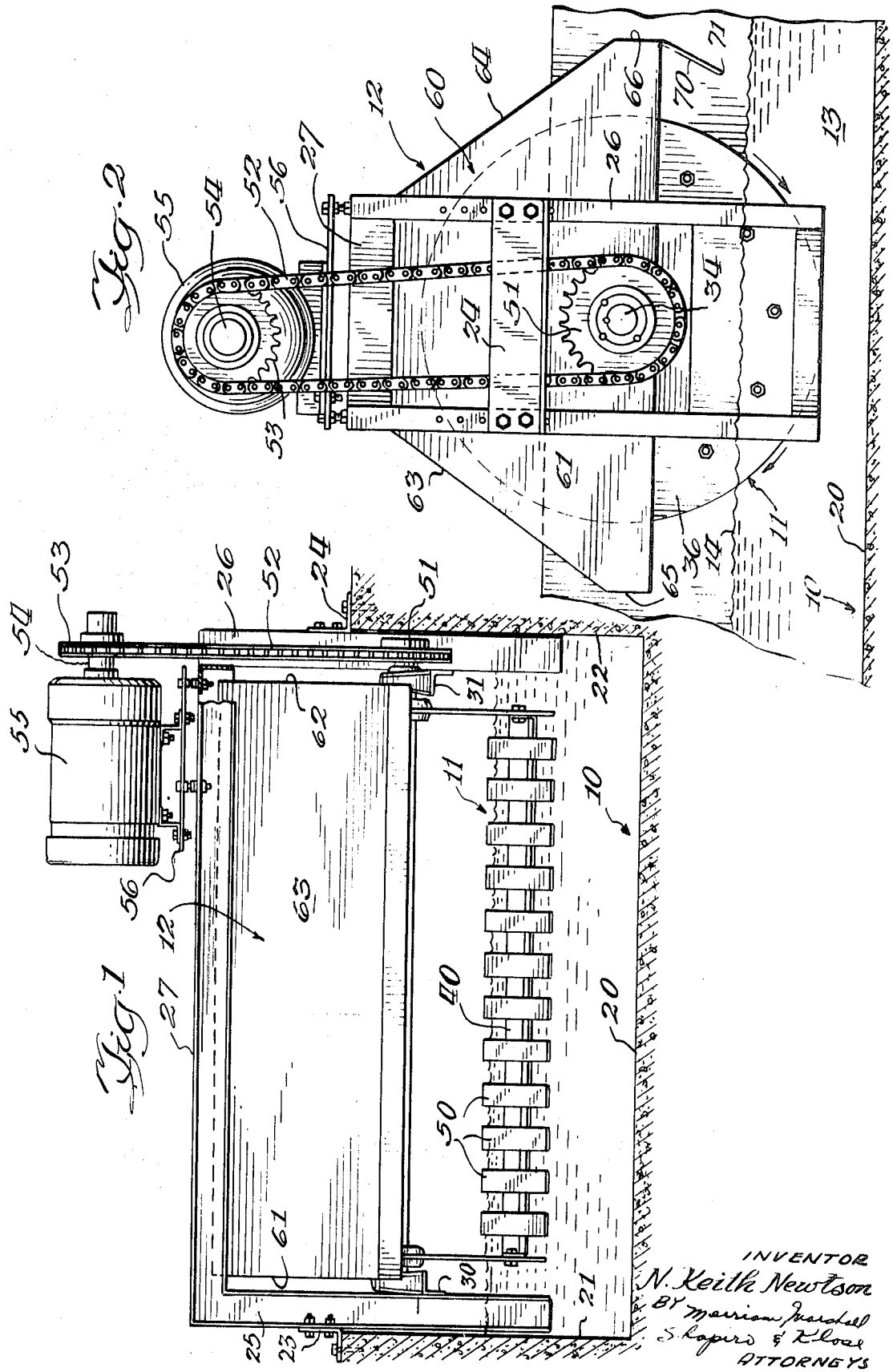

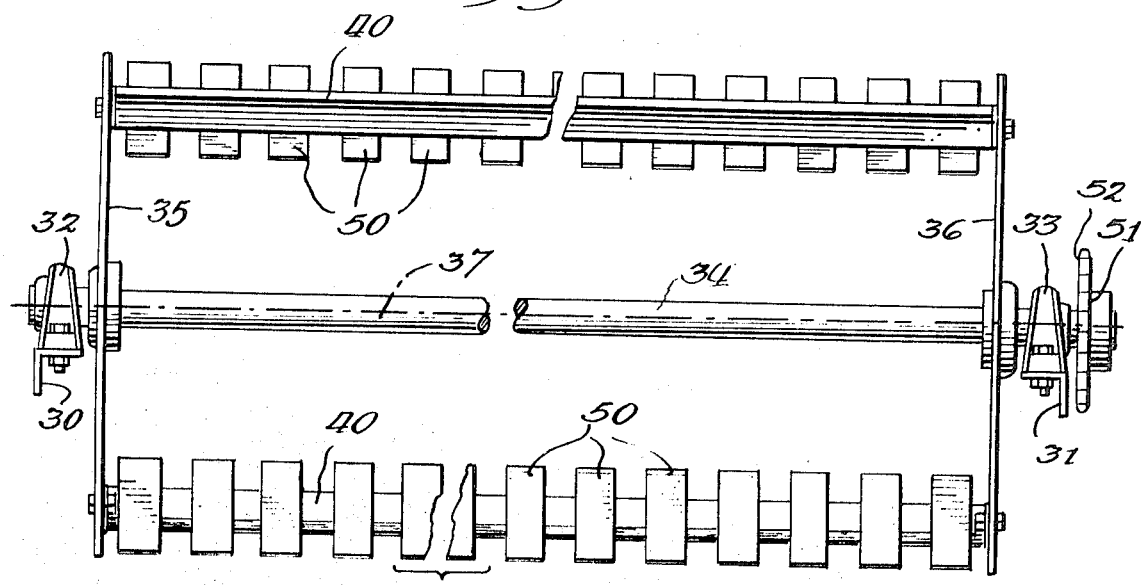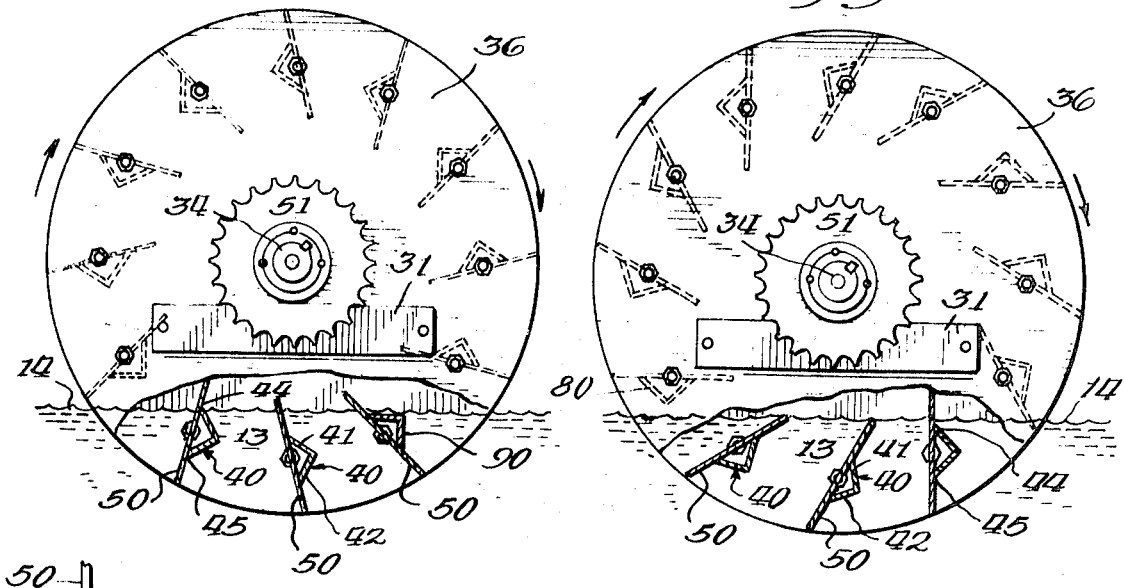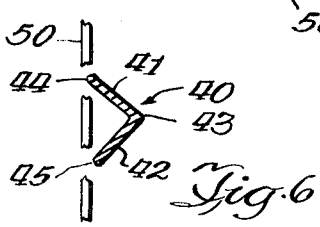

AERATION DEVICE

CROSS REFERENCE TO RELATED APPLICATION

This is a continuation of application Ser. No. 646,333 filed June 15, 1967 and now abandoned.

BACKGROUND OF THE INVENTION

The present invention relates generally to an apparatus for aerating animal waste, such as hog or cattle manure, and more particularly to an aeration rotor used with a pit containing a body of liquid for receiving animal waste falling into the pit through openings in the slatted floor of an animal house built atop the pit. In another embodiment, the invention relates to an aeration rotor and a hood cooperating with the rotor.

Modern housing for cattle and hogs has slatted floors through which animal waste, such as manure and urine, fall into an underlying pit containing a body of liquid, such as water, for receiving the waste. Fresh animal waste contains biologically harmful organic matter; and means are provided, such as an aeration rotor, to mix air into the body of liquid to oxidize the biologically harmful ingredients in the animal waste and render them biologically unharmful. Animal waste which has been thus treated is free of foul-smelling odors and gas which may be harmful to the animals housed above the pit. Animal waste thus treated, may be subsequently used as fertilizer without health problems.

Aeration rotors conventionally operate around the clock. Therefore, a demand for increased oxidation cannot be met by increasing the operating time of the aeration rotor. Increasing the number of aeration rotors, or the size of the aeration rotor, to increase the amount of air mixed into the body of liquid, is undesirable from an economic standpoint.

Another problem arising during the operation of an aeration rotor is the accumulation of foam on the surface of the body of liquid; and, unless checked, the foam accumulation can build up until it seeps upwardly through the slatted floor in the cattle or hog house.

SUMMARY OF THE INVENTION

In accordance with the present invention, the aeration rotor is provided with structure for increasing the amount of air mixed with the liquid, during a given rotation of the rotor. In one embodiment, structure is provided for entrapping air, from above the body of liquid, and releasing the entrapped air beneath the surface of the liquid. In another embodiment, structure is provided for lifting liquid from the body of liquid above the surface of the liquid and then spilling the lifted liquid through the air back into the body of liquid.

To minimize the foaming problem, the aerator is provided with a baffle having a deflector portion extending downwardly below the axis of the rotor behind the rotor, for deflecting carry-over liquid, carried from the body of liquid around the rotor during rotation thereof, back toward the bottom of the rotor. Without this deflector portion carry-over liquid falling behind the rotor would push accumulations of foam, located behind the rotor, away from the rotor, and this is undesirable from the standpoint of minimizing foaming. The deflector terminates substantially above the surface of the liquid, so that foam accumulations behind the rotor are permitted to pass beneath the deflector and through the rotor. When this occurs, foam accumulations behind the rotor are minimized.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 1 is a side elevational view illustrating a pit within which is mounted an embodiment of an aeration rotor in accordance with the present invention;

FIG. 2 is an end view of the rotor of FIG. 1 and also illustrates an embodiment of a baffle for the rotor, in accordance with the present invention;

FIG. 3 is a fragmentary side view of an embodiment of an aeration rotor in accordance with the present invention;

FIG. 4 is an end view, partially cut away and partially in section, of an embodiment of an aeration rotor;

FIG. 5 is an end view, partially cut away and partially in section, of another embodiment of an aeration rotor; and FIG. 6 is an enlarged sectional view, partially broken away, illustrating a portion of a cross member and blade of an embodiment of an aeration rotor.

DESCRIPTION OF THE PREFERRED EMBODIMENTS

Referring initially to FIGS. 1 and 2, there is indicated generally, at 10, a pit for containing a body of liquid 13 for receiving animal waste. Pit 10 is conventionally located below the slatted floor of a building (not shown) for housing animals. Mounted in pit 10 is an aeration rotor, indicated generally at 11, partially immersed below the surface 14 of liquid body 13 and partially enclosed by a hood indicated generally at 12. As rotor 11 rotates, it mixes air from above surface 14 with the body of liquid 13.

Pit 10 includes a bottom 20 and opposed sidewalls 21, 22. Mounted atop sidewalls 21, 22 respectively are a pair of frame brackets 23, 24 to which are attached respective opposite side portions 25, 26 of a rotor-mounting frame having a top portion 27.

Referring to FIG. 3, attached to frame side portions 25, 26 respectively are rotor brackets 30, 31 respectively mounting bearings 32, 33 rotatively mounting a rotor shaft 34 having an axis 37 and extending between a pair of rotor end plates 35, 36 between which also extend a plurality of rotor cross members 40.

Referring to FIGS. 2 and 3, mounted on an end of shaft 34 extending through rotor end plate 36 is a sprocket 51 driven by a chain 52 driven by a sprocket 53 mounted on a shaft 54 driven by a motor 55 mounted on a plate 56 located on top portion 27 of the rotor-mounting frame.

Cross member 40 has an angle-shaped cross section with the open side of the angle facing substantially toward the direction of rotation of the rotor, the rotor being mounted for rotation in a clockwise sense as viewed in FIGS. 4 and 5.

Referring to FIG. 6, each angle-shaped cross member 40 has a pair of flanges 41, 42 extending from a mutual junction at 43 toward a respective outer edge 44, 45. Both of the flange outer edges 44, 45 lie in a plane which is non-intersecting and parallel to the rotor's axis 37. Flange outer edge 44 is closer to the rotor axis than is flange outer edge 45.

Mounted on each cross member 40 are a plurality of blades 50, each of the blades on an individual cross member being spaced apart along the length of the cross member with each of the blades extending across the outer edges 44, 45 of the flanges 41, 42 of the cross member. Each of the blades 50 lies in substantially the same plane as that in which the flange outer edges 44, 45 lie.

Referring to the embodiment of rotor illustrated in FIG. 4, flange outer edge 44 lies in a radial plane rotatively following the radial plane in which flange outer edge 45 lies. (A radial plane is a plane passing through the axis of the rotor.) In other words, when the rotor is rotated in a clockwise sense, as viewed in FIG. 4, the radial plane passing through outer edge 45 of a given cross member 40 is in advance of the radial plane passing through outer edge 44 of the same cross member 40.

As a result, each of the angle-shaped cross members 40 lifts liquid, from the body of liquid 13, above the surface 14 of the body and then spills the liquid back into the body, as the cross member moves upwardly out of the liquid body during rotation of the rotor. More specifically, the cross member illustrated in dotted lines at 80 in FIG. 4 is lifting liquid above the surface of the body of liquid, and the lifted liquid will be spilled back into the body of the liquid as the cross member continues to rotate beyond a position illustrated at 80 in FIG. 4. This increases the amount of air mixed with the liquid in body of liquid 13.

Plates 50 also cooperate to carry liquid above the surface of the liquid during rotation of the rotor, and then spill the lifted liquid back into the body of liquid. The blades mounted on the cross member indicated at 80 in FIG. 4 have carried liquid up above the surface of the liquid, and this liquid is then spilled back into the liquid as the blades rotate in a clockwise sense, beyond the position indicated at 80 in FIG. 4.

Referring now to FIG. 5, flange outer edge 44 lies in a radial plane which is rotatively in advance of the radial plane in which the other flange outer edge 45 lies. In this embodiment, as the rotor rotates and a cross member 40 is immersed in the body of liquid 13, below the surface thereof, air, from above the body of liquid, is entrapped beneath cross member 40 and released below the surface of the liquid.

More specifically, air has been entrapped by the cross member indicated at 90 in FIG. 5 and the air entrapped therein is released, beneath the surface of the body of liquid, as the cross member continues to rotate, in a clockwise sense as shown in FIG. 5, beyond the position illustrated at 90. As a result, air is mixed into the body of liquid 13 during rotation of the rotor.

In the embodiments of both FIGS. 4 and 5, a given cross member 40 and its attached plates 50 perform the above described air-liquid mixing function more effectively than would be the case if the blades 50 and both flange outer edges 44, 45 lay in a common radial plane.

Referring now to FIGS. 1 and 2, hood 12 includes an upper portion, indicated generally at 60 in FIG. 2, and substantially enclosing the aeration rotor above the axis thereof. Hood upper portion 60 includes a pair of opposite ends 61, 62 and a pair of downwardly and outwardly diverging side parts 63, 64 connected to vertically depending bottom parts 65, 66 respectively. Extending from the rearward bottom part 66 of hood upper portion 60 is a deflector 70 terminating at a bottom edge 71.

As aeration rotor 11 mixes air into liquid body 13, foam is generated on the surface 14 of the liquid. Deflector 70 is provided to prevent accumulations of foam from building up on liquid surface 14 behind rotor 11 (to the right as viewed in FIG. 2) and oozing up through the openings in the slatted floor of the animal house located above pit 10.

More specifically, as the rotor rotates, liquid from the body of liquid is carried, by the rotor, above the surface of the liquid and around with the rotor. This carry-over liquid falls downwardly back into the body of liquid, behind the rotor. Any foam which has accumulated behind the rotor is, in the absence of preventive structure, pushed rearwardly away from the rotor by the carry-over liquid falling behind the rotor. When the foam is pushed away from behind the rotor, it is not possible for the foam to move through the rotor during rotation thereof. Movement of the foam through the rotor is desirable to prevent accumulations of foam behind the rotor.

Deflector 70 directs carry-over liquid falling behind the rotor downwardly and inwardly toward the rotor. As a result, the carry-over liquid does not push foam accumulations, located behind the rotor, away from the rotor; and the foam is free to move through the rotor, during rotation thereof. When foam moves through the rotor, it moves from a location, to the right of the rotor in FIG. 2, in a direction to the left as viewed in FIG. 2.

The vertical distance deflector 70 extends below the axis of the rotor, and the vertical spacing of deflector bottom edge 71 above liquid surface 14 are both important. If deflector 70 is too short, a condition approaching that which exists in the complete absence of a deflector occurs. That is, the carry-over liquid tends to push the foam accumulations behind the rotor away from the rotor. If deflector 70 is too long (e.g., if deflector bottom edge 71 were located at liquid surface 14), it acts as an obstacle which prevents foam accumulations located behind the rotor and behind deflector 70 from moving through the rotor, during rotation thereof a deflector in accordance with the present invention permits foam accumulations located behind the rotor and behind the deflector to move through the rotor during rotation thereof. As previously pointed out, movement of the foam through the rotor is important to prevent excessive accumulations of foam.

In the optimum embodiment, deflector lower edge 71 is located vertically below rotor axis 37 a distance equal to the rotor radius minus 1½ times the maximum immersion depth for which the rotor is intended. Typically, the maximum intended immersion depth for a rotor is less than one-half the radius thereof. For example, a typical rotor has a diameter of about 28 inches, and the maximum intended immersion depth for a rotor of this size is about 6 inches. For the same rotor, deflector lower edge 71 would be located, in accordance with the above-noted formula, approximately 5 inches below the rotor axis, a distance greater than one-fourth the rotor radius.

Because deflector 70 is intended to direct carry-over liquid downwardly and inwardly toward the bottom portion of the rotor, it should extend downwardly and inwardly from upper hood portion 66 toward the bottom portion of rotor 11. In no event, should deflector 70 extend downwardly and outwardly away from the bottom portion of rotor 11 because then it would not perform its intended function of deflecting the carry-over liquid toward the bottom portion of the rotor.

The foregoing detailed description has been given for clearness of understanding only, and no unnecessary limitations should be understood therefrom, as modifications will be obvious to those skilled in the art.

What is claimed is:

1. In combination:
    a pit for containing a body of liquid for receiving animal waste;
    an aeration rotor including blade means, extending outwardly relative to the axis of the rotor, for introducing air into the liquid contained in said pit;
    means mounting said aeration rotor for immersion of the rotor and the blade means into said liquid to a maximum depth less than the radius of said rotor;
    the outside edges of said blade means defining the outside of said rotor;
    a hood partially enclosing said rotor;
    said hood including a lower rear deflector portion extending downwardly below said rotor axis and inwardly toward said rotor, behind the rotor, and terminating above the rotor bottom;
    said blade means including means for carrying liquid from said body of liquid around with the blade means during rotation of the rotor;
    said deflector portion comprising means for directing carry-over liquid, carried from said body of liquid around with said blade means during rotation of the rotor, toward the bottom portion of the rotor;
    said hood having a rear edge at the bottom of said deflector portion and a front edge on the other side of the rotor from said rear edge;
    said rotor including blade means extending downwardly below both the front and rear edges of the hood; and
    means, including means on said hood and on said deflector portion, for permitting foam accumulating on the liquid surface behind the rotor and on the outside of the hood to pass through the bottom portion of the rotor during rotation thereof.

2. In the combination of claim 1 wherein: said lower rear deflector portion terminates above the maximum immersion level for said rotor; and
    said passage-permitting means comprises means for permitting said foam to pass through the bottom portion of the rotor at all immersion depths of the rotor.

3. In the combination of claim 2 wherein:
    said front edge of the hood is located above the maximum immersion level for the rotor.

4. In the combination of claim 2 wherein:
    the lower end of said deflector portion extends below the rotor axis a distance equal to the rotor radius minus one and one-half times said maximum immersion depth.

5. In the combination of claim 4 wherein:

said maximum immersion depth is less than one-half the radius of the rotor;

and said lower end of the deflector portion extends below the rotor axis a distance greater than one-fourth the radius of the rotor.

6. In combination: an aeration rotor including blade means, extending outwardly relative to the axis of the rotor, for introducing air into a body of liquid contained in a pit and immersible in said body of liquid to a maximum depth less than the radius of said rotor;

the outside edges of said blade means defining the outside of said rotor;

a hood partially enclosing said rotor;

said hood including a lower rear deflector portion extending downwardly below said rotor axis and inwardly toward said rotor, behind the rotor, and terminating above the rotor bottom;

said blade means including means for carrying liquid from said body of liquid around with the blade means during rotation of the rotor;

said deflector portion comprising means for directing carry-over liquid, carried from said body of liquid around with said blade means during rotation of the rotor, toward the bottom portion of the rotor;

said hood having a rear edge at the bottom of said deflector portion and a front edge on the other side of the rotor from said rear edge;

said rotor including blade means extending downwardly below both the front and rear edges of the hood;

and means on said hood and on said deflector portion for permitting foam accumulating on the liquid surface behind the rotor and on the outside of the hood to pass through the bottom portion of the rotor during rotation thereof when the rotor is immersed in said body of liquid.

7. In the combination of claim 6 wherein:

said lower rear deflector portion terminates above the maximum immersion level for said rotor;

and said passage-permitting means comprises means for permitting said foam to pass through the bottom portion of the rotor at all immersion depths thereof.

8. In the combination of claim 7 wherein:

said front edge of the hood is located above the maximum immersion level for the rotor.

9. In the combination of claim 7 wherein:

the lower end of said deflector portion extends below the rotor axis a distance equal to the rotor radius minus one and one-half times said maximum immersion depth.

10. In the combination of claim 9 wherein:

said maximum immersion depth is less than one-half the radius of the rotor;

and said lower end of the deflector portion extends below the rotor axis a distance greater than one-fourth the radius of the rotor.

11. A method for aerating a body of liquid, contained in a pit for receiving animal waste, with a rotor having blade means extending outwardly relative to the axis of the rotor, said method comprising the steps of:

immersing said rotor and said rotor blades in said liquid to a maximum depth less than the radius of said rotor;

partially enclosing the rear of said rotor with a hood;

rotating said rotor to introduce air into said liquid;

carrying liquid from said body of liquid around with said blade means during rotation of the rotor;

deflecting carry-over liquid, carried from said body of liquid around with said rotor to the rear of the rotor during rotation thereof, toward the bottom portion of the rotor; and permitting foam, accumulating on the liquid surface behind the rotor and on the outside of the hood, to pass without obstruction through the bottom portion of the rotor during rotation thereof.

12. A method as recited in claim 11 wherein said last recited step comprises permitting said passage of foam through the bottom portion of the rotor at all immersion depths of the rotor.

* * * * *